United States Patent Office 3,164,558
Patented Jan. 5, 1965

3,164,558
SELF-EXTINGUISHING URETHANE POLYMER COMPOSITIONS
Jacob Eichhorn, Midland, Mich., assignor to The Dow Chemical Company, Midland, Mich., a corporation of Delaware
No Drawing. Filed Mar. 10, 1960, Ser. No. 13,983
25 Claims. (Cl. 260—2.5)

This invention relates to urethane polymer compositions. More particularly, it relates to self-extinguishing polyurethane compositions and cellular structures made from such compositions. This invention also pertains to compositions suitable for rendering materials self-extinguishing.

Polyurethanes are polymers containing repeated

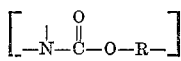

urethane linkages. These polymers are made by reacting a polyisocyanate with a compound having a plurality of active hydrogens. Foams made from polyurethane resins have excellent strength, durability, low density, light color, uniformity, and good heat insulating properties, and can be used for many purposes Unfortunately, these foams will burn readily when ignited, that is, they will support combustion thus making them unsuitable for certain uses in which fire is a hazard. Accordingly, it is desirable to make polyurethane resin foams which are self-extinguishing so as to eliminate or minimize the hazard of fire. By "self-extinguishing" it is meant that the material is incapable of burning or sustaining a flame for more than a short time after it is separated from an open flame in which it has been heated and ignited. In other words, a composition is considered to be self-extinguishing if it stops burning shortly after a flame used to start its burning has been removed or the material is taken out of the flame.

The polyisocyanate used to make the resin may be a diisocyanate such as hexamethylene diisocyanate, 2,4-tolylene diisocyanate, 2,6-tolylene diisocyanate, naphthalene diisocyanate-1,5 and mixtures thereof. The compound mentioned above having a plurality of active hydrogens may be a polyhydroxy compound such as glycols, glycerols, polyesterpolyols and polyetherpolyols. A polyesterpolyol may be made by reacting a polybasic acid with an excess of a polyhydric alcohol. If a linear polyesterpolyol is desired, difunctional reactants should be used such as phthalic acid or its anhydride with glycol. A polyetherpolyol may be made by condensing a polyhydroxy compound such as glycol, glycerol and sucrose with an alkylene oxide such as ethylene oxide, propylene oxide, and butylene oxide. Using a mixture of polypropylene oxide glycerols of the formula

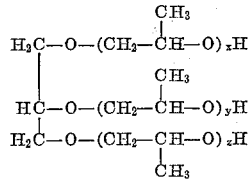

produces a rigid polymer when the sum of $x$, $y$, and $z$ is about 6 and a flexible polymer when the sum of $x$, $y$, and $z$ is about 15 or higher. Alkylene oxide-sucrose condensates produce rigid polymers when polymerized with polyisocyanates. Polymers of varying rigidity and flexibility can be tailored by selecting a condensate or a mixture of condensates of suitable molecular weight and structure to be reacted with the polyisocyanate. Other hydroxyl-rich compounds such as a condensate of ethylenediamine with proplyene oxide can be used to produce useful polyurethanes. By still another approach, polyurethanes can be made by reacting a bischloroformate with a polyamine.

Polyurethane resins can be made in cellular form by adding water or a carboxyl group-containing compound to a reaction mixture containing polyisocyanates, whereby carbon dioxide is liberated which causes the liquid reaction mixture to expand and foam. Alternatively, a polyurethane foam may be made by admixing a volatile liquid with one of the reactants, namely, the polyisocyanate or the compound containing a plurality of active hydrogens, before they are mixed. The volatile liquid and the reactants can all be brought together simultaneously or the volatile liquid can be mixed with the reactants shortly after they are brought together. The volatile liquid is converted to a gas when the reactants are combined due to the heat of the reaction or by external heating thereby producing small gas bubbles in the reacting liquid. Examples of suitable volatile liquids which can be used for this purpose are trichloromonofluoromethane, hexane, methylchloroform, symmetrical tetrachlorodifluoroethane, and trichlorotrifluoroethane.

A catalyst for the reaction between the isocyanate radical and active hydrogen can be used when making urethane polymers and is usually desirable when a product of cellular form is to be made. Representative examples of suitable catalysts are, triethylenediamine, dibutyltin dilaurate, triethylamine, N,N-dimethylcyclohexylamine, cobalt naphthenate and stannous octoate.

If desired, a cell size control agent can be added to the reaction mixture. Materials such as copolymers of polyethylene glycol and dimethylsiloxane serve to produce cells of smaller size in polyurethane foams. These materials can be made as described in British Patent No. 793,501. Representative examples of other cell size control agents are dioctyl sulfosuccinate and zinc stearate.

Certain organic bromine compounds particularly organic bromine compounds containing two or more bromine atoms attached to carbon atoms of an aliphatic or cycloaliphatic radical have a tendency to render foams with which they are admixed self-extinguishing by reducing the time that such foams continue to burn after having been separated from a flame causing their ignition. However, these organic bromides produce disadvantageous effects in foams in which they are incorporated, such as impairment of tensile strength, original appearance, light stability, and other properties of the foams, when used as the sole agent and in sufficient quantity to render foams self-extinguishing. In addition, these bromine compounds increase the cost of foams made with them when the bromine compounds are used in such amounts as to cause an appreciable improvement in the self-extinguishing properties of the foams.

It is an object of the present invention to produce urethane polymer compositions having improved self-extinguishing properties.

A further object of the present invention is to provide self-extinguishing polyurethane resin foam compositions.

A still further object of this invention is to produce self-extinguishing polyurethane foams of good strength and appearance in an economical manner.

Still another object of this invention is the provision of a composition of matter useful for rendering materials self-extinguishing.

These and other objects are accomplished in accordance with the following detailed description of this invention.

It has now been discovered that certain inorganic oxides in combination with certain organic bromides act synergistically to render urethane polymers self-extinguishing when admixed therewith.

In accordance with the invention it has been found that self-extinguishing urethane polymers are provided when both certain organic bromides and certain inorganic oxides are present in an intimate mixture in urethane polymer material. The synergistic effect of the organic bromides and the inorganic oxides in combination, uniformly dispersed throughout the polymeric material is such that a given total amount of a combination of these synergists imparts substantially greater self-extinguishing properties to urethane polymers than does the same amount of either of these materials used alone. In situations in which a quantity of one of the materials used alone produces some self-extinguishing effect on polyurethane polymers, a lesser quantity of the new combination of an organic bromide with an inorganic oxide will produce the same or an improved effect.

The organic bromides which can be employed according to the invention are organic bromides containing a plurality of bromine atoms in an aliphatic or a cycloaliphatic radical, these bromine atoms constituting at least 45 percent by weight of the molecule. The bromine atoms are preferably attached to adjacent or vicinal carbon atoms in an aliphatic or a cycloaliphatic radical, e.g., the cyclohexyl radical. The organic bromides can be formed by addition of bromine to an olefinic linkage or by the addition of bromine to the unsaturation of benzene, or by substitution of bromine for hydrogen, e.g., by the bromination of aliphatic organic compounds. Examples of suitable organic bromides are methyl 2,3-dibromopropionate, tris(2,3-dibromopropyl) phosphate, carbon tetrabromide, tetrabromoethylene, 1,2-dibromo-1,1,2,2-tetrachloroethane, 1,1,2,2-tetrabromoethane, dibromodichloromethane, 1,2-dibromo-1,1-dichloroethane, 1,2 - dibromo-1,2,2-trichloroethane, 1,2,3,4-tetrabromobutane, pentabromobutane, 1,2,3-tribromopropane, 1,2,4-tribromobutane, tetrabromopentanes, pentabromoethane, hexabromoethane, dibromosuccinic acid, 1,2 - di(dibromomethyl)benzene, alpha, beta-dibromoethylbenzene, 1,2,3,4,5,6-hexabromocyclohexane, 1,2,3,4,5-pentabromo-6-chlorocyclohexane, tetrabromodichlorocyclohexanes and tribromotrichlorocyclohexanes. The bromochlorocyclohexane compounds can be prepared by reaction of chlorine and bromine with benzene under the influence of actinic radiation, e.g., ultraviolet light or sunlight, employing a procedure similar to that described in Bull. soc. chim. (France), pages 118–121 (1949).

In accordance with the invention, the materials that act synergistically with the organic bromides are certain inorganic oxides, namely, antimonous oxide, arsenous oxide, arsenic oxide, and phosphoric oxide.

The organic bromides are employed in proportions corresponding to from 2 to 30 percent, preferably from 3 to 20 percent, together with the oxide in amounts of from 1 to 20 percent, preferably from 2 to 10 percent. The percentages are based on the weight of the polymer, including the blowing agent when a blowing agent is used.

Self-extinguishing urethane polymer compositions are obtained by employing both the organic bromides and the oxides, in proportions within these ranges.

The organic bromide and the oxide can be incorporated in the polymer by any method which gives uniform distribution of the agents throughout the body of the polymer and which does not cause or result in appreciable deterioration or decomposition of either of said agents.

The organic bromide and the inorganic oxide can be premixed and then added to the isocyanate material or the active hydrogen containing material before the said materials are brought together to form the polymer. Alternatively, the synergists of this invention can be premixed and then blended with the polymer forming reactants as they are brought together or shortly after they are combined and before the reaction has proceeded to a point where uniform dispersion of the synergists in the polymer is no longer practicable. If desired, the synergistic agents of this invention may be added one at a time to the polymer forming constituents. To illustrate, one of the agents can be added to the isocyanate material, to the active hydrogen containing material, to a mixture of these materials as they are brought together or shortly thereafter and before the reaction of the polymer forming constituents has proceeded to a point where uniform dispersion of the additive in the polymer is no longer practicable, or at two or more of these places. The other agent can be added at one or more of the above places which may be the same or different from where the first agent is added.

When using the synergistic agents of this invention in premixed form, the premixture preferably contains from 3 to 20 parts by weight of organic bromide as above defined, and from 2 to 10 parts by weight of synergistic inorganic oxide. A composition containing about 10 parts by weight of organic bromide and about 5 parts by weight of inorganic oxide is found especially suitable for purposes of this invention.

The formulations of this invention can be made by batch methods employing either hand mixing or simple stirring equipment. Several types of mechanical equipment are available which can automatically meter the constituents to a mixer and dispense foams in predetermined quantities. This equipment can be run either continuously or intermittently.

Self-extinguishing polymer compositions of this invention can be made into useful articles by conventional molding, casting, coating and laminating techniques. Foams of these compositions can be cast onto a conveyor belt to produce sheets or slabs of self-extinguishing polyurethane foams which may then be cut into convenient sizes. The self-extinguishing foams made from the compositions of this invention can be cast in molds to make desired shapes or the foams can be cast in place to fill voids in a final article as in the potting of electrical equipment and the strengthening of double walled members.

The following examples, in which the parts are parts by weight are illustrative of the present invention but are not to be construed as limiting its scope.

EXAMPLE I

There are dissolved in 33.6 parts of a polyol [having a hydroxyl content of about 17.3 percent (determined by acetylation) and a viscosity of 200 stokes at 24° C. formed by reacting a mixture of equal parts of glycerine and sucrose with propylene oxide], ¼ part of triethylenediamine and ¼ part of dibutyltin dilaurate. Into this solution there is then admixed ¼ part of a copolymer of polyethylene glycol and dimethylsiloxane, the copolymer having an average molecular weight of 2,500 and made as described in British Patent No. 793,501. The mixture is stirred and cooled to 50° F. To this cooled mixture is then added with stirring 12.4 parts of tricolorofluoromethane as a blowing agent. The above composition is rapidly admixed in a container with 53.25 parts of an adduct of a polyol and an excess of a mixture of tolylene diisocyanates, there being 80 percent of the 2,4-isomer and 20 percent of the 2,6-isomer in the diisocyanate mixture. The polyol has an average molecular weight of 4000 and is made by condensing propylene oxide with glycerine. The excess of the tolylene diisocyanate is such that the —NCO content of the adduct is about 30 percent. The polyoltolylene diisocyanate adduct has a viscosity of 105 stokes at 24° C. Based on the weight of the above total mixture there is then added 10 parts per hundred of tris(2,3-dibromopropyl) phosphate and 5 parts per hundred of finely divided antimonous oxide. Stirring is again employed to assure uniform distribution of all constituents. The mass begins to foam and is discharged into a mold. When the foam has gelled it is placed in a curing oven at 70° C. After 15 minutes the foam is removed from the oven and allowed to cool to room temperature. The cellular mass is a white, rigid, fine-celled foam.

A test strip is cut from the foamed product and tested for flammability. The strip is in the shape of a rectangular prism three inches long, ¾ inch in width, and ³⁄₁₆ inch thick. The strip is placed in the flame of a microburner and after approximately four seconds, it is removed. Upon removal from the microburner flame, the strip is itself aflame, and continues to burn for 2 seconds from the time it is removed from the microburner flame. After the 2 seconds have elsaped, the flame on the foamed polymer strip goes out, that is, the material no longer sustains a flame, and is said to have a self-extinguishing time of 2 seconds.

By contrast, foam strips are made and tested in the manner described in Example I using the same constituents but omitting either the antimonous oxide or the tris(2,3-*dibromopropyl*) phosphate, and varying the amount of the agent used. The results of the tests are shown in Table I.

*Table I*

| Tris(2,3-dibromopropyl) phosphate (p.p.h.)[1] | Antimonous Oxide (p.p.h.)[1] | Self-Extinguishing time (seconds) |
|---|---|---|
| 15 | 0 | Burns completely. |
| 20 | 0 | 15. |
| 25 | 0 | 5. |
| 0 | 20 | Burns completely. |

[1] Parts per hundred.

EXAMPLES II THROUGH IV

Foam strips are made and tested as in Example I except that 5 parts of one of the three inorganic oxides listed below, in finely divided form, is substituted for the antimonous oxide of Example I. The results obtained appear in Table II.

*Table II*

| Example | Oxide | SE[1] Time (seconds) |
|---|---|---|
| II | $As_2O_3$ | 1 |
| III | $As_2O_5$ | 7 |
| IV | $P_2O_5$ | 2 |

[1] Abbreviation for "Self-Extinguishing."

By contrast, foam strips are made and tested as in Example I except that 5 parts of one of each of the following oxides is substituted for the antimonous oxides of Example I: $Sb_2O_5$, $B_2O_3$, $Fe_2O_3$, $HgO$, $Bi_2O_3$, $PbO$, $TiO_2$, $Al_2O_3$, $ZnO$, $BaO$, $CaO$. None of these foams is self-extinguishing. They all burn completely.

EXAMPLES V THROUGH XI

Foam strips are made and tested as in Example I using 5 parts per hundred of antimonous oxide as indicated therein except that 10 parts of one of each of the organic bromides listed below is substituted for the organic bromide used in Example I. The results obtained appear in Table III.

*Table III*

| Example | Organic Bromide | SE Time (Seconds) |
|---|---|---|
| V | 1, 2, 3, 4, 5-pentabromo-6 chlorocyclohexane | 2 |
| VI | Acetylene tetrabromide | 3 |
| VII | Sym-dibromotetrachloroethane | 3 |
| VIII | 1, 2, 3, 4-tetrabromobutane | 2 |
| IX | Pentabromobutane | 3 |
| X | Hexabromoethane | 4 |
| XI | Dibromosuccinic acid | 3 |

EXAMPLES XII AND XIII

Foam strips are made and tested as in Example I using varying amounts of antimonous oxide and varying amounts of tris(2,3-dibromopropyl) phosphate. The results obtained appear in Table IV, the parts being parts by weight based on 100 parts by weight of the weight of the mixture as in Example I. Example I is included for comparison.

*Table IV*

| Example | Tris (2, 3-dibromopropyl) phosphate (p.p.h.) | Antimonous Oxide (p.p.h.) | SE Time (Seconds) |
|---|---|---|---|
| I | 10 | 5 | 2 |
| XII | 15 | 2 | 1½ |
| XIII | 20 | 2 | 1 |

EXAMPLES XIV THROUGH XVI

To 31 parts of octakis(2-hydroxypropyl)sucrose are added 55.5 parts of an adduct made by reacting at 75° C. for 3 hours 16.65 parts a triol having a molecular weight of 418 and a viscosity of 625 centipoises at 25° C. made by reacting propylene oxide with 2,2-di(hydroxymethyl) butanol-1, and 38.85 parts of a mixture of tolylene diisocyanates, there being 80 percent of the 2,4-isomer and 20 percent of the 2,6-isomer in the diisocyanate mixture. To the resulting admixture are added ¼ part of a copolymer of polyethylene glycol and dimethylsiloxane, the copolymer having a molecular weight of about 2,500 and made as described in British Patent No. 793,501, ¼ part of triethylamine, 13 parts of trichlorofluoromethane, and 10 parts of tris(2,3-dibromopropyl) phosphate. The above composition is divided into 3 parts to each of which powdered antimonous oxide is added in parts per hundred based on the above composition in amounts indicated in the Table V. Each of the mixtures is thoroughly stirred to insure uniform distribution of the ingredients throughout the mass. The mass is discharged into a mold as it begin to foam and is cured in an oven. After it has cooled to room temperature, strips are cut from the rigid foam and tested as in Example I. The results obtained are shown in Table V.

*Table V*

| Example | Antimonous Oxide (p.p.h.) | SE Time (Seconds) |
|---|---|---|
| XIV | 5 | 6 |
| XV | 8 | 1½ |
| XVI | 10 | 1 |

EXAMPLE XVII

To 60 parts of a polyester resin, made by heating at 150° C. for 1½ hours a mixture of 4 moles of glycerine, 2 moles of adipic acid and ½ mole of phthalic anhydride, are added 3 parts tris(2,3-dibromopropyl) phosphate, 3 parts of triethylamine and ½ part dibutyltin dilaurate. The constituents are agitated and there is then added 40 parts of a mixture of tolylene diisocyanates, there being 80 percent of the 2,4-isomer and 20 percent of the 2,6-isomer in the mixture. The system is then mixed for about 10 minutes while cooling with ice water. To this composition there is admixed 4 parts of a 10 percent solution of dioctyl sulfosuccinate in acetone, 3 parts of zinc stearate and 5 parts of powdered antimonous oxide. The mixture foams and is permitted to stand for 24 hours at room temperature to form a rigid cellular mass. Strips are cut from the foam and tested as in Example I. The result of the test is shown in Table VI.

EXAMPLES XVIII THROUGH XX

The procedure of Example XVII is repeated using the same ingredients except that amounts of the tris(2,3-dibromopropyl) phosphate and the antimonous oxide are varied as shown in Table VI below with the test results.

Table VI

| Example | Tris(2,3-dibromopropyl) phosphate (parts) | Antimonous Oxide (parts) | SE Time (Seconds) |
|---|---|---|---|
| XVII | 3 | 5 | 3 |
| XVIII | 5 | 5 | 1 |
| XIX | 10 | 5 | 1 |
| XX | 20 | 2 | 1 |

EXAMPLE XXI

To 50 parts of a polyglycol having an average molecular weight of 2700 made by reacting propylene oxide with glycerine, are added 50 parts of hydroxyl-terminated polypropylene oxide having an average molecular weight of 2000, 32 parts of 2,4-tolylene diisocyanate, 8 parts of 2,6-tolylene diisocyanate, a mixture of 7.235 parts of tris-(2,3-dibromopropyl) phosphate and 2.894 parts of powdered antimonous oxide (this corresponds to 5 parts per hundred of the bromine compound and 2 parts per hundred of the oxide based on the weight of total composition of this example excluding the bromine compound and the oxide), 0.85 part of a copolymer of polyethylene glycol and dimethylsiloxane having an average molecular weight of 2,500 and made as described in British Patent No. 793,501, 0.4 part stannous octoate, 0.35 part dibutyltin dilaurate and a mixture of 2.9 parts of water with 0.2 part of triethylenediamine. The mixture foams and sets on standing to form a flexible spongy mass. Strips are cut and tested for self-extinguishing quality as in Example I. The result of the test is given in Table VII, infra.

EXAMPLE XXII

The procedure of Example XXI is repeated using the same ingredients except that phosphorus pentoxide is substituted for the antimonous oxide. The results of the tests are shown in Table VII.

Table VII

| Example | Tris(2,3-dibromopropyl) phosphate (p.p.h.) | $Sb_2O_3$ (p.p.h.) | $P_2O_5$ (p.p.h.) | SE Time (Seconds) |
|---|---|---|---|---|
| XXI | 5 | 2 | 0 | 1 |
| XXII | 5 | 0 | 2 | 2 |

EXAMPLE XXIII

To 136 parts octakis[2(2-hydroxypropoxy)propyl]sucrose, made by reacting 1 mole of octakis(2-hydroxypropyl)sucrose with 8 moles of 1,2-propylene oxide, are added ¼ part triethylenediamine, 87 parts of an 80/20 mixture of 2,4- and 2,6-tolylene diisocyanates, 20 parts per hundred of tris(2,3-dibromopropyl) phosphate, 2 parts per hundred of antimonous oxide (each of these latter two constituents being based on the weight of the total composition of this example exclusive of the bromine compound and the inorganic oxide) 1.3 parts of a copolymer of polyethylene glycol and dimethylsiloxane, the copolymer having an average molecular weight of 2,500 and made as described in the above referenced British patent, and 31.2 parts of trichlorofluoromethane. The constituents are thoroughly mixed and the foam formed is cured in an oven to a rigid cellular mass. Strips of the foam are cut and tested as in Example I. The results are shown on Table VIII.

EXAMPLES XXIV AND XXV

The procedure of Example XXIII is repeated using the same materials except that the amounts of antimonous oxide used are varied as shown in Table VIII along with the results of the tests.

EXAMPLES XXVI THROUGH XXVIII

The procedure of Example XXIII is repeated using the same materials except that phosphorus pentoxide is substituted for the antimonous oxide in amounts shown in Table VIII along with the test results.

EXAMPLES XXIX THROUGH XXXIV

The procedure of Example XXIII is repeated using the same materials except that 10 parts of tris(2,3-dibromopropyl) phosphate are used along with varying amounts of $Sb_2O_3$ or $P_2O_5$ as shown in Table VIII with the test results.

Table VIII

| Example | Tris(2,3-dibromopropyl) phosphate (p.p.h.) | $Sb_2O_3$ (p.p.h.) | $P_2O_5$ (p.p.h.) | SE Time (Seconds) |
|---|---|---|---|---|
| XXIII | 20 | 2 | 0 | 6 |
| XXIV | 20 | 5 | 0 | 2½ |
| XXV | 20 | 10 | 0 | 1½ |
| XXVI | 20 | 0 | 2 | 6 |
| XXVII | 20 | 0 | 5 | 4 |
| XXVIII | 20 | 0 | 8 | 3 |
| XXIX | 10 | 8 | 0 | 9 |
| XXX | 10 | 10 | 0 | 4 |
| XXXI | 10 | 12 | 0 | 3 |
| XXXII | 10 | 0 | 8 | 5 |
| XXXIII | 10 | 0 | 10 | 4 |
| XXXIV | 10 | 0 | 15 | 3 |

EXAMPLE XXXV

An adduct is made of a polyol (having an average molecular weight of 4000, a hydroxyl number of about 42.4 and made by condensing propylene oxide with glycerine) with an excess of a mixture of tolylene diisocyanates, there being 80 percent of the 2,4-isomer and 20 percent of the 2,6-isomer in the mixture. The excess of the tolylene diisocyanate is such that the —NCO content of the adduct is about 30 percent. The polyol-tolylene diisocyanate adduct has a viscosity of 105 stokes at 24° C. To 64.04 parts of said adduct is added 33.80 parts of octakis[2-(2-hydroxypropoxy)propyl]sucrose, 20 parts of tris(2,3-dibromopropyl) phosphate, 2 parts of $Sb_2O_3$, and 0.3 part of a copolymer of polyethylene glycol and dimethylsiloxane, the copolymer having an average molecular weight of 2,500 and made as described in British Patent No. 793,501. There is then added, dissolved in 1.66 parts of water, 0.2 part of triethylenediamine. The constituents are thoroughly mixed and the foam formed is cured in an oven. Strips are cut from the foam and tested as in Example I. The results of the test are shown in Table IX.

EXAMPLES XXXVI AND XXXVII

The procedure of Example XXXV is repeated using the same materials except that the amounts of $Sb_2O_3$ are varied as shown in Table IX along with the test results.

Table IX

| Example | $Sb_2O_3$ (p.p.h.) | SE Time (Seconds) |
|---|---|---|
| XXXV | 2 | 7 |
| XXXVI | 5 | 5 |
| XXXVII | 8 | 2 |

It has been found that mixtures of the organic bromides of this invention with $Sb_2O_3$, $As_2O_3$, $As_2O_5$, and $P_2O_5$ are stable. As shown by examples given above, the synergistic combinations of the bromine compounds and inorganic oxides of this invention can be pre-mixed and then used to render the products self-extinguishing.

In using the mixtures of this invention one or more of the organic bromine compounds can be used with one or more of the oxides. When smaller amounts of the synergistic mixtures are used than indicated in the examples the self-extinguishing time is greater than indicated in the examples; when greater amounts are used the self-extinguishing time becomes less. While greater amounts of the synergistic mixtures than necessary to produce self-extinguishing times of less than one second can be used without harmful effect, the use of such amounts is presently considered uneconomic. It will be understood, that in the practice of the invention, various other additives may be incorporated in the polymer along with the presently disclosed synergists, such as fillers, pigments, dyes, plasticizers, and stabilizers.

While the invention has been described with reference to particular embodiments thereof, it will be understood that in its broader aspects, it is not limited thereto, but the invention may be variously embodied within the scope of the invention as set forth herein and in the appended claims.

I claim:

1. A composition of matter comprising a polyurethane resin containing intimately admixed therewith from 2 to 30 parts based on the weight of the resin of an organic compound having a plurality of bromine atoms attached to the carbon atoms of a radical selected from the group consisting of cyclohexyl and aliphatic radicals, the bromine atoms constituting at least 45 perecent by weight of the compound, and from 1 to 20 parts based on the weght of the resin of an inorganic oxide selected from the group consisting of $Sb_2O_3$, $As_2O_3$, $As_2O_5$, $P_2O_5$ and mixtures thereof.

2. A composition according to claim 1 in which the organic bromine compound is tris(2,3-dibromopropyl) phosphate.

3. A composition according to claim 2 in which the inorganic oxide is $Sb_2O_3$.

4. A composition according to claim 2 in which the inorganic oxide is $As_2O_3$.

5. A composition according to claim 1 in which the inorganic oxide is $Sb_2O_3$.

6. A composition according to claim 5 in which the organic bromine compound is 1,2,3,4,5-pentabromo-6-chlorocyclohexane.

7. A composition according to claim 5 in which the organic bromine compound is 1,2,3,4-tetrabromobutane.

8. A self-extinguishing foam comprising a normally flammable polyurethane resin in intimate admixture with from 1 to 20 parts based on the weight of the resin of an oxide selected from the group consisting of $Sb_2O_3$, $As_2O_3$, $As_2O_5$ $P_2O_5$ and mixtures thereof, and from 2 to 30 parts based on the weight of the resin of an organic compound having a plurality of bromine atoms attached to carbon atoms of a radical selected from the group consisting of the cyclohexyl and aliphatic radicals, the bromine atoms consisting of at least 45 percent of the organic compound.

9. A self-extinguishing foam according to claim 8 in which the organic bromine compound is tris(2,3-dibromopropyl) phosphate.

10. A self-extinguishing foam according to claim 9 in which the inorganic oxide is $Sb_2O_3$.

11. A self-extinguishing foam according to claim 9 in which the inorganic oxide is $As_2O_3$.

12. A self-extinguishing foam according to claim 8 in which the inorganic oxide is $Sb_2O_3$.

13. A self-extinguishing foam according to claim 12 in which the bromine compound is 1, 2, 3, 4, 5-penetabromo-6-chlorocyclohexane.

14. A self-extinguishing foam according to claim 12 in which the bromine compound is 1,2,3,4-tetrabromobutane.

15. A self-extinguishing rigid resin foam comprising a normally flammable polyurethane resin and, uniformly distributed throughout the resin and based on the weight of the polyurethane resin and entrapped gas, from 3 percent to 20 percent of an organic compound having a plurality of bromine atoms atached to carbon atoms of a radical selected from the group consisting of the cyclohexyl and aliphatic radicals, the bromine atoms consisting of at least 45 percent by weight of the organic compound, and based on the weight of the urethane resin and entrapped gas from 2 percent to 10 percent of an oxide selected from the group consisting of $Sb_2O_3$, $As_2O_3$, $As_2O_5$, $P_2O_5$ and mixtures thereof.

16. A self-extinguishing rigid cellular material comprising by weight, 100 parts of a polyurethane resin, about 10 parts of tris(2,3-dibromopropyl) phosphate and about 5 parts of antimonous oxide.

17. A composition of matter for rendering normally flammable materials self-extinguishing when intimately incorporated therein comprising from 3 to 20 parts by weight of an organic compound having a plurality of bromine atoms attached to carbon atoms of a radical selected from the group consisting of cyclohexyl and aliphatic radicals, the bromine atoms constituting at least 45 percent by weight of the organic compound and from 2 to 10 parts by weight of an oxide selected from the group consisting of $Sb_2O_3$, $As_2O_3$, $As_2O_5$, $P_2O_5$ and mixtures thereof.

18. A composition for rendering normally flammable materials self-extinguishing when intimately incorporated therein comprising about 10 parts by weight of tris(2,3-dibromopropyl) phosphate and about 5 parts by weight of antimonous oxide.

19. A composition of matter according to claim 1 in which the organic bromine compound is 1,2,3,4,5-pentabromo-6-chlorocyclohexane.

20. A composition of matter according to claim 8 in which the organic bromine compound is 1,2,3,4,5-pentabromo-6-chlorocyclohexane.

21. A composition of matter according to claim 15 in which the organic bromine compound is 1,2,3,4,5-pentabromo-6-chlorocyclohexane.

22. A self-extinguishing rigid cellular material comprising by weight, 100 parts of a polyurethane resin, about 10 parts of 1,2,3,4,5-pentabromo-6-chlorocyclohexane and and about 5 parts by weight of antimonous oxide.

23. A composition of matter capable of synergistic self-extinguishing activity when incorporated in a polyurethane resin, said composition being a mixture of about 10 parts by weight of 1,2,3,4,5-pentabromo-6-chlorocyclohexane and about 5 parts by wegiht of antimonous oxide.

24. A composition of matter for rendering normally flammable materials self-extinguishing when intimately incorporated therein comprising from 2 to 30 parts by weight of an organic compound having a plurality or bromine atoms attached to carbon atoms of a radical selected from the group consisting of cyclohexyl and aliphatic radicals, the bromine atoms constituting at least 45 percent by weight of the organic compound and 1 to 20 parts by weight of an oxide selected from the group consisting of $Sb_2O_3$, $As_2O_3$, $As_2O_5$, $P_2O_5$ and mixtures thereof.

25. A self-extinguishing rigid resin foam comprising a normally flammable polyurethane resin and, uniformly distributed throughout the resin and based on the weight of the polyurethane resin and entrapped gas, from 2 percent to 30 percent of an organic compound having a plurality of bromine atoms attached to carbon atoms of a radical selected from the group consisting of the cyclohexyl and aliphatic radicals, the bromine atoms consisting of at least 45 percent by weight of the organic compound, and based on the weight of the urethane resin and entrapped gas from 1 percent to 20 percent of an oxide selected from the group consisting of $Sb_2O_3$, $As_2O_3$, $As_2O_5$, $P_2O_5$ and mixtures thereof.

References Cited in the file of this patent

UNITED STATES PATENTS

| | | |
|---|---|---|
| 2,634,244 | Simon et al. | Apr. 7, 1953 |
| 2,676,927 | McCurdy et al. | Apr. 27, 1954 |
| 3,039,991 | Cooper | June 19, 1962 |

FOREIGN PATENTS

| | | |
|---|---|---|
| 792,016 | Great Britain | Mar. 19, 1958 |